March 19, 1929.　　F. MLADINICH　　1,705,489
HELICOPTER TYPE FLYING MACHINE
Filed May 24, 1927　　5 Sheets-Sheet 1
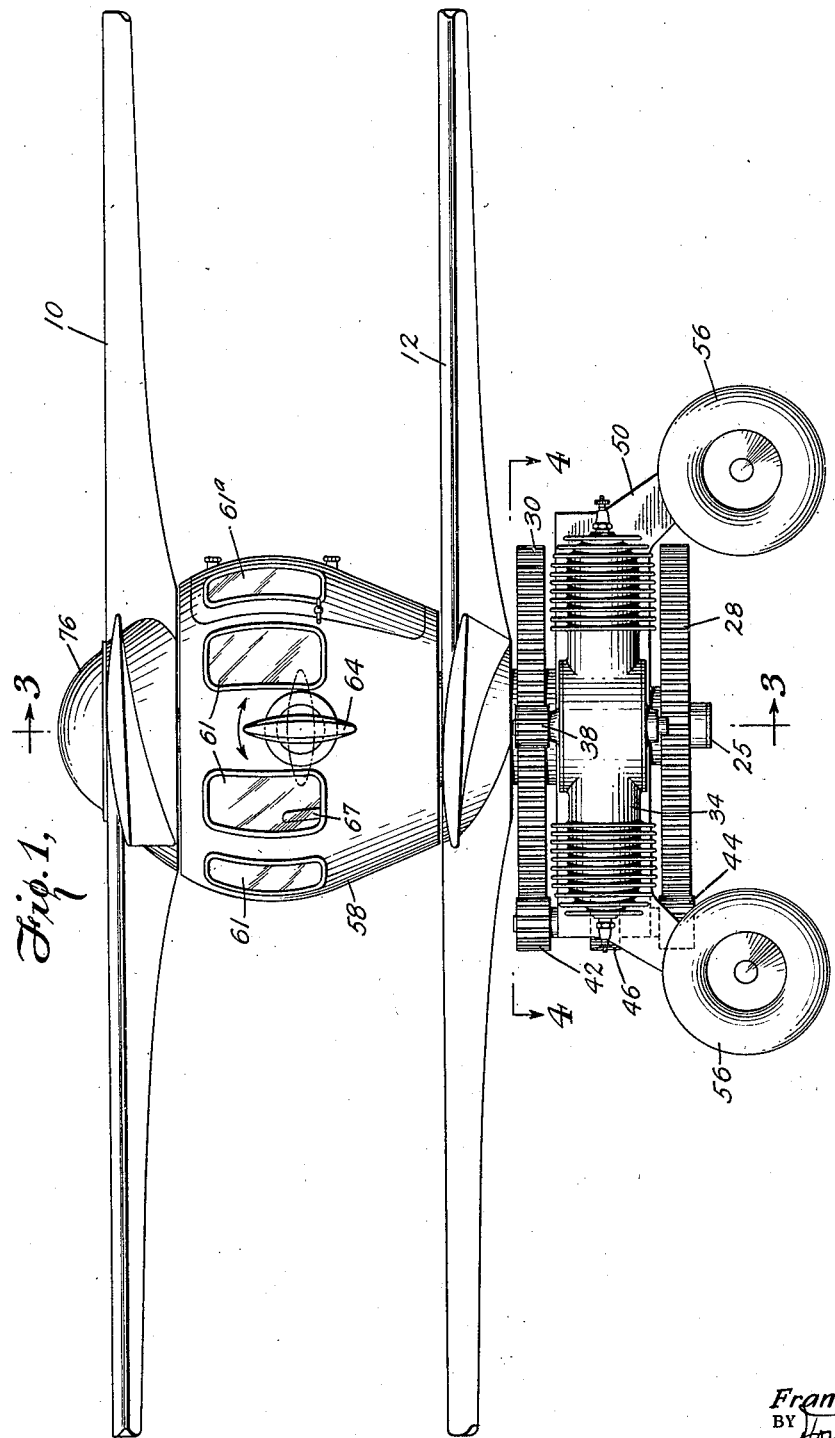
INVENTOR
Frank Mladinich
BY Townsend & Decker
ATTORNEYS

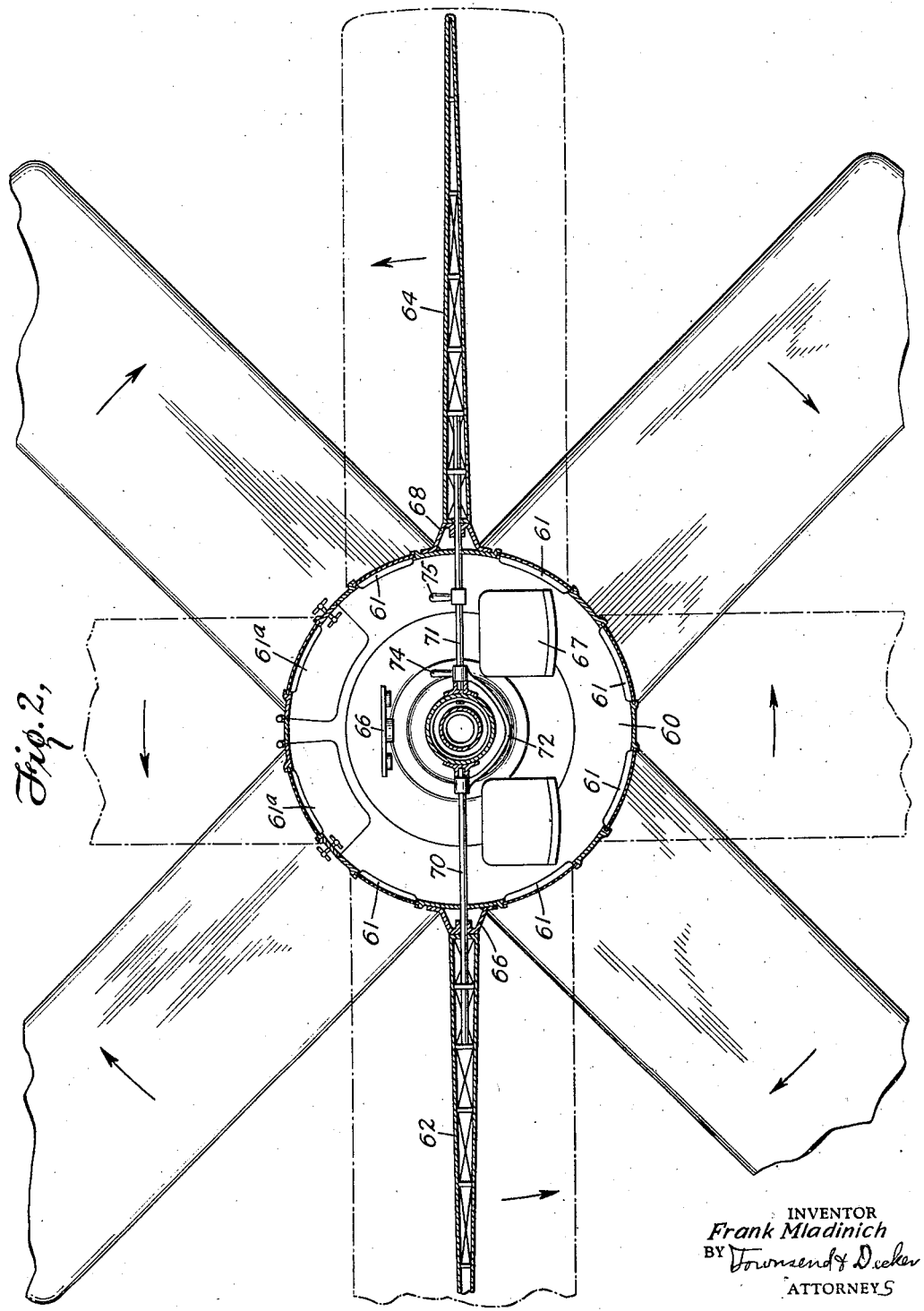

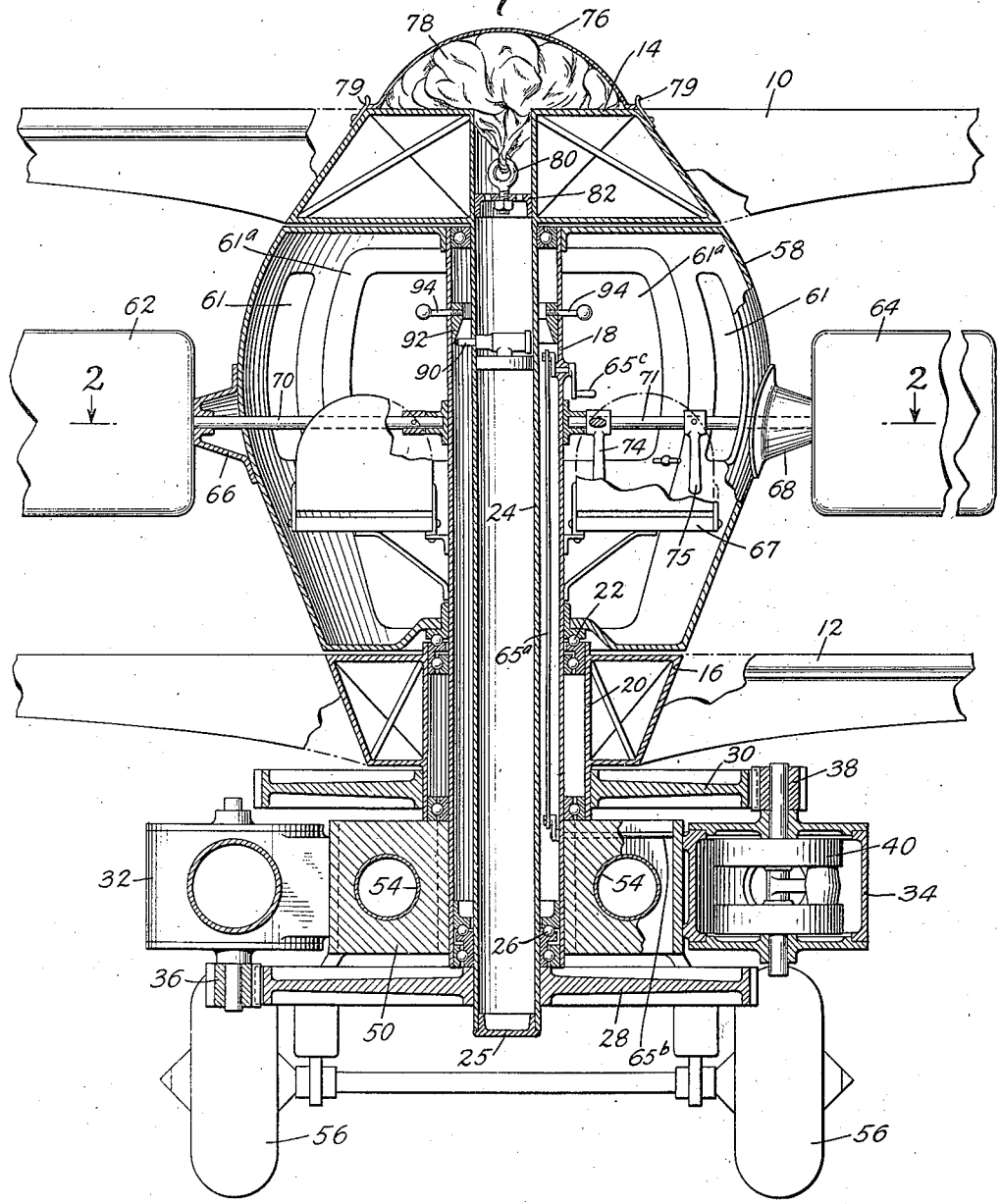

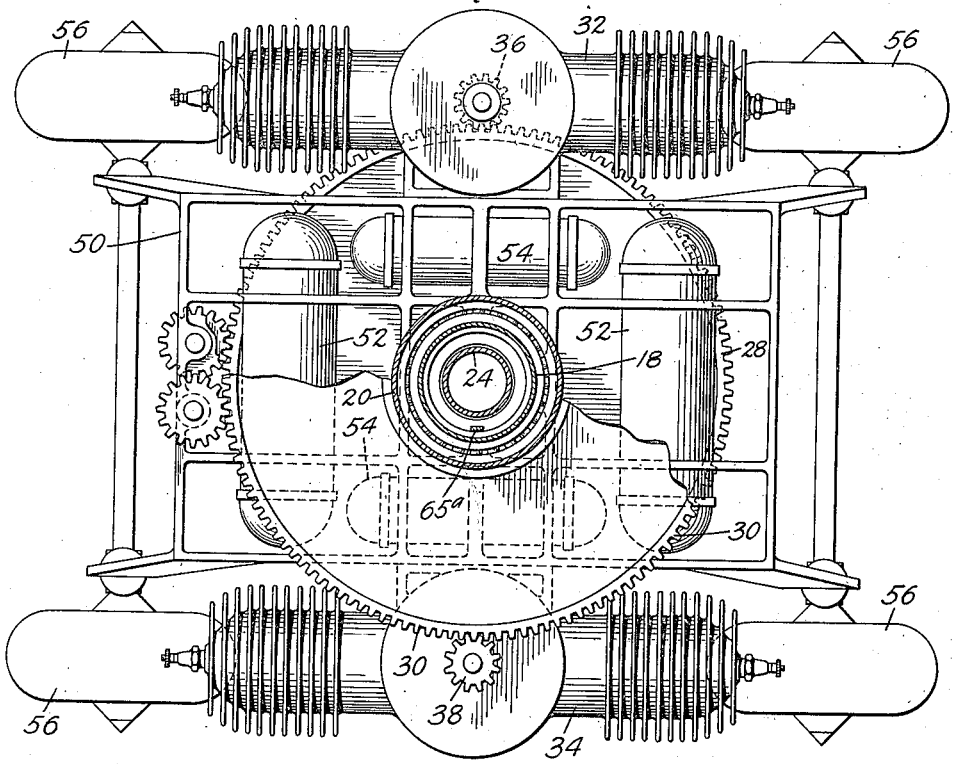
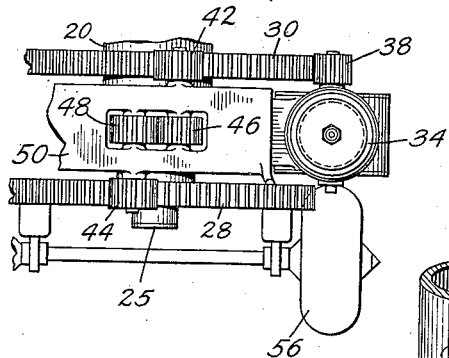
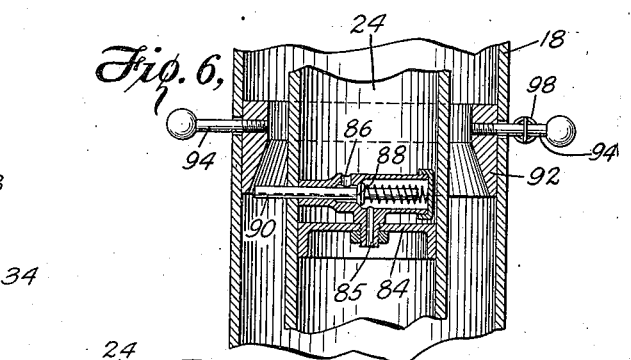
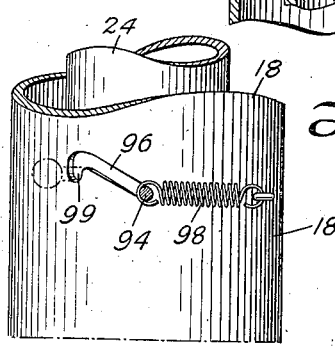

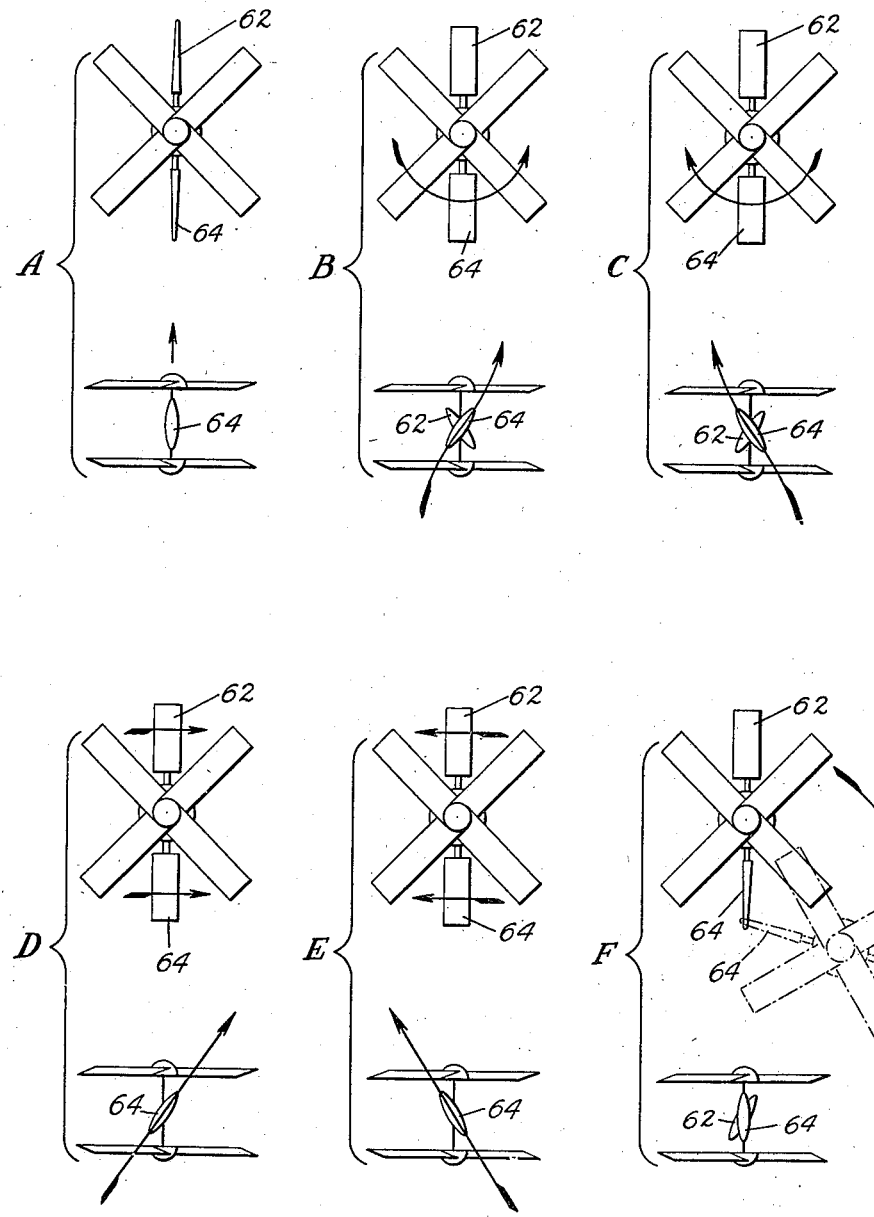

Patented Mar. 19, 1929.

1,705,489

UNITED STATES PATENT OFFICE.

FRANK MLADINICH, OF NEW YORK, N. Y.

HELICOPTER-TYPE FLYING MACHINE.

Application filed May 24, 1927. Serial No. 193,779.

This invention relates to a flying machine of the heavier than air type, commonly known as a helicopter.

It is among the primary objects of the invention to provide a more perfectly balanced and proportioned machine than those heretofore constructed.

It is a further object to provide improved directing means for the machine which will permit the same to be moved bodily or circularly in any direction.

It is a still further object to provide an improved mechanism for supporting a parachute and readily operable mechanism for freeing the parachute.

Other objects relate to the particular construction and location of the cabin and supporting frame as will become apparent from the following description.

Referring now to the drawings wherein there is illustrated one complete embodiment of my invention:

Fig. 1 is a side elevation of the machine.

Fig. 2 is a horizontal sectional view taken on the line 2—2 of Fig. 3.

Fig. 3 is a vertical sectional view taken substantially on the line 3—3 of Fig. 1.

Fig. 4 is a transverse sectional and plan view of a portion of the apparatus, the view being taken on the line 4—4 of Fig. 1.

Fig. 5 is a detail elevational view of a portion of the supporting frame.

Figs. 6 and 7 are details of the parachute operating mechanism.

Fig. 8 represents a series of diagrammatic illustrations of the operation of the machine.

This helicopter flying machine is provided with upper and lower sets of wings 10 and 12 each set comprising four wings or blades rigidly secured to the central supporting hubs 14 and 16 respectively. The wings 10 and 12 are mounted for horizontal rotation on the central vertical column 18 constituting the main frame of the machine. The hub 16 of the lower set of wings is formed with a central cylindrical hub portion 20 rotatably mounted upon the outer surface of the column 18, suitable ball bearings or other bearings being provided for reducing the friction between the rotatable hub and the column 18. The thrust bearings for the hub 16 of the wings 12 are preferably of the ball type as indicated at 22, these bearings serving to prevent longitudinal movement of the hub 16 with respect to the column 18.

Since it is preferred to mount the motor driving mechanism for the wings adjacent the lower portion of the machine there is provided an elongated cylindrical shaft 24 formed integral with or securely attached to the upper wing support 14, the shaft 24 extending throughout substantially the entire height of the machine and the lower end of the shaft being closed by the plug 25 thus enclosing the interior of this shaft for a purpose to be hereinafter referred to. The shaft 24 and accordingly the hub 14 are supported for rotation within the column 18 by means of suitable ball bearings or other bearings, the vertical thrust between the shaft 24 and column 18 being borne by the thrust bearing 26 indicated as a circular ball bearing.

For the purpose of rotating the wings and the respective drive shafts 24 and 20 therefor, these shafts are provided with relatively large gears 28 and 30 respectively secured to the lower end of the shaft 24 and cylindrical hub member 20. The gears 28 and 30 are driven by the motors 32 and 34 respectively through the intermediacy of the spur gears 36 and 38. The motor power may be of any preferred type preferably two-cylinder opposed air-cooled internal combustion engines for the purpose of rotating the crank shafts 40 one of which carries upon its upper end and the other of which carries upon its lower end the gears 38 and 36 respectively. While a separate power plant is provided for each set of wings it is considered essential that the wings be geared for simultaneous and opposite rotation. To this end there are provided gears 42 and 44 meshing with the driving gears 30 and 28 respectively, these gears being rigidly secured to supporting shafts which carry the additional gears 46 and 48 of the same size as the gears 42 and 44 and enmeshed as indicated in Fig. 5 to cause the reverse rotation of the driving pinions and gears.

The relatively strong supporting frame 50 constitutes a support for the entire mechanism. The supporting frame or base 50 directly carries the motors 32 and 34 and preferably supports a plurality of supply tanks as indicated at 52, 54, etc., for fuel and oil and other supplies. The frame 50 carries wheels 56 as shown upon which the machine may be supported when the same is at rest or, if desired, pontoons may be substituted therefor in case it is desired that the machine be capable of being landed upon the water.

The cabin of the machine is shown as supported by the main column 18 between the planes of the wings 10 and 12. The cabin 60 includes the outer walls 58 and any desired number of windows 61, doors 61ª, seats 67, etc. as will be readily understood. The entire cabin or body casing is preferably pear-shaped in order to constitute the least possible obstruction to the passage of the wind past the same. The controls for the motors comprise movable elements 65ª mounted within the column 18 and connected with the controlling rods 65ᵇ extending to the engine control valve, the operating rods being controlled by the hand levers 65ᶜ positioned within convenient reach of the operator, who occupies one of the seats 67. The instrument board 66 may contain instruments for recording the speed of the motors, the oil pressure, the altitude, and any other desirable information for assisting the operator.

The angular position and direction of movement of the machine are controlled by means of the two controlling wings or planes 62 and 64 positioned on opposite sides of the cabin. These wings are supported by means of the brackets 66 and 68 secured to the cabin casing 58 and by means of the rotatable supporting rods 70 and 71. The rod 70 is formed with a semi-circular extension 72 rigidly secured to the same and passing around the central column 18 and terminating in a handle 74 by means of which the angular position of the wing 62 is controlled. The end of the bracket 72 adjacent the handle 74 may be loosely supported upon the rod 71 or, if desired, the handle 74 may contain a releasable latch or other mechanism for causing the shaft 71 to be rotated with the handle 74 and shaft 70 if desired. The angular position of the wing 64 is similarly controlled by the handle 75 rigidly secured to the shaft 71. It will be understood that the planes or wings 62 and 64 may be suitably reinforced to give them the necessary strength and that they will be formed so as to constitute the smallest possible obstruction to their passage through the air.

The upper portion of the hub 14 is formed as a pocket with a displaceable cover 76 which cover completes the general contour of the body of the machine and forms an enclosure of the size necessary to contain a parachute 78. The cover 76 is shown as held in place by means of the spring clips 79 so that the cover may be forced off in the manner indicated below. The ropes for the parachute are secured to the loop 80 carried by the apertured bracket 82 mounted within the inner vertical shaft 24. As stated above the lower end of the hollow shaft 24 is closed by means of the plug 25, the purpose of this construction being to permit a supply of compressed air to be maintained within the interior of the shaft 24. This compressed air is utilized for the purpose of forcing the cap 76 from its secured position so as to release the parachute for operation to enable the machine to descend slowly, in the event that both motors should cease to function. The compressed air within the tubular shaft 24 is permitted to escape through the closure 84 by means of the ducts 85, and 86 normally closed by the spring-pressed valve closure 88. This valve is formed with an extension 90 positioned to be engaged by the circular operating member 92 when the latter is lowered. The operator 92 is normally maintained in elevated position by means of the outwardly extending arms 94 which ride in slots 96 formed as shown in Fig. 7. The rods 94 are drawn into a position to lower the operator 92 by means of the tension springs 98 secured to the column 18 and to one of the projecting arms 94. The slot 96 on its upper end is formed with a depression 99 into which the arms 94 may rest with the operator 92 in inoperative position. The operator 92 may be depressed and the compressed air permitted to escape from the interior of the shaft 24 into the parachute pocket by raising the arms 94 out of the notches 99 of the corresponding slots.

The operation of the mechanism may be readily seen from an inspection of Fig. 8 wherein the various modifications of which the machine is capable are shown.

In this figure the illustration A indicates the machine when it is moved vertically with the controlling planes 62, 64 arranged vertically. Illustrations B and C indicate the positions of the planes 62 and 64 when they are rotated in opposite directions to the right and to the left respectively to cause the machine to describe a circle. Illustrations D and E indicate the condition of the controlling planes 62 and 64 when the machine is being moved bodily in either of two directions respectively wherein both wings 62 and 64 are similarly inclined. Illustration F indicates the action which takes place when one of the wings 62 is inclined and the other wing 64 is maintained in a vertical position.

Having now described my invention what I claim and desire to secure by Letters Patent is:

1. In a machine of the type described, a fixed vertical column constituting a portion of the main frame, upper and lower wing supports rotatably supported on said column, a cabin rigidly supported on said column, a frame supported directly on said column, a motor carried by said frame, supporting wheels mounted on said frame, means supported interiorly of said column for transmitting power from said motor to said upper wing supports and means supported exteriorly upon said column for transmitting power from said motor to said lower wing supports, and means for rotating said wing supports.

2. In a machine of the type described, a cabin, a rotatable supporting wing, a rotatable hollow shaft operatively connected with said wing for transmitting rotative movement thereto and a parachute pocket formed with a displaceable wall, said hollow shaft serving as a storage receptacle for compressed air, and means for releasing said compressed air from said hollow shaft to said pocket for displacing said wall.

3. In a machine of the type described, a central supporting column, a cabin, a rotatable supporting wing, a parachute pocket formed with a displaceable wall, and means for supplying compressed air to said pocket to displace said wall and free said parachute, said means comprising a circular operating cam movably mounted on said column and a coacting valve member rotatable with said wing.

4. In a heavier than air flying machine, a tubular body column, upper and lower wings rotatably supported on said column, a frame rigidly supported by said column, power means carried by said frame and operatively connected with said wings for rotating the same, a cabin rigidly supported on said column between the planes of said wings and means extending from said cabin through said column for controlling said power means.

Signed at New York, in the county of New York and State of New York, this 19th day of May, A. D. 1927.

FRANK MLADINICH.